March 4, 1969
C. F. CARTER ET AL
3,430,720
METHODS AND APPARATUS FOR WEIGHING MATERIAL IN
A VACUUM ENVIRONMENT
Filed May 12, 1966
Sheet 1 of 2
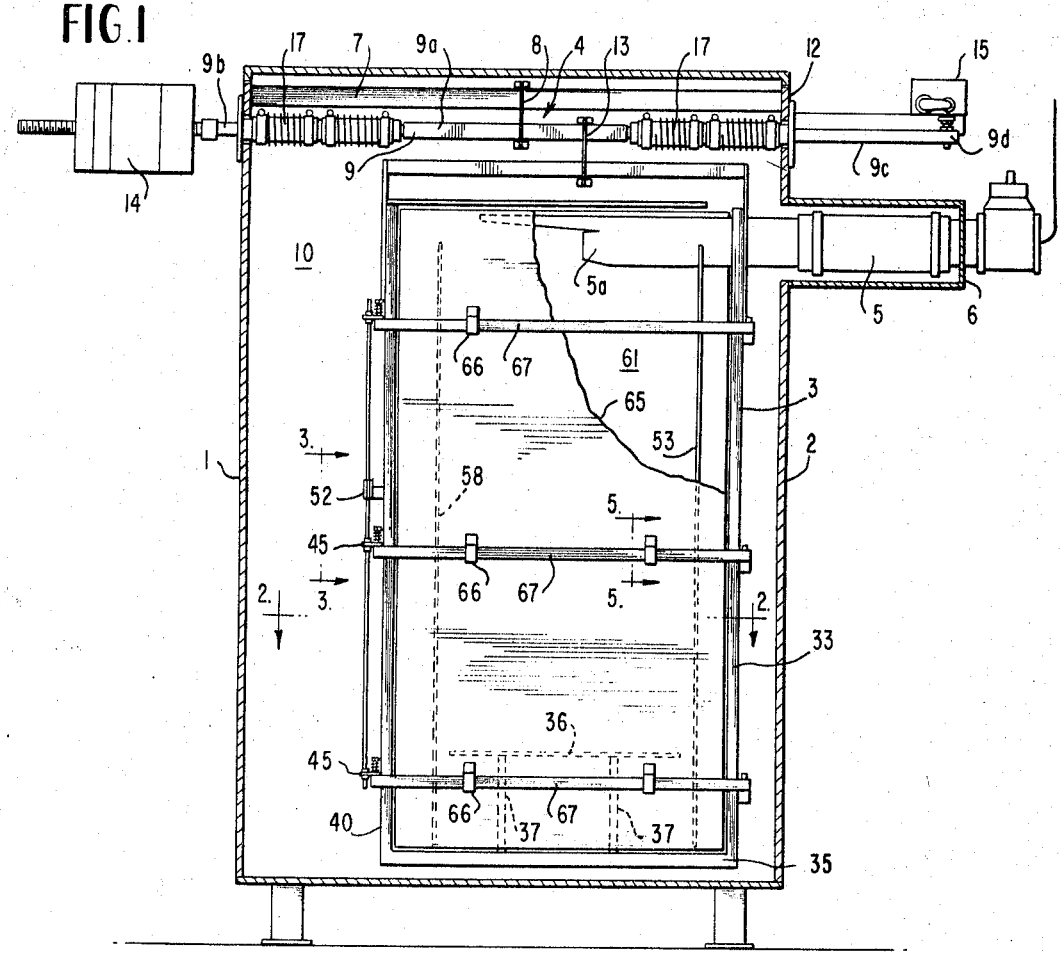
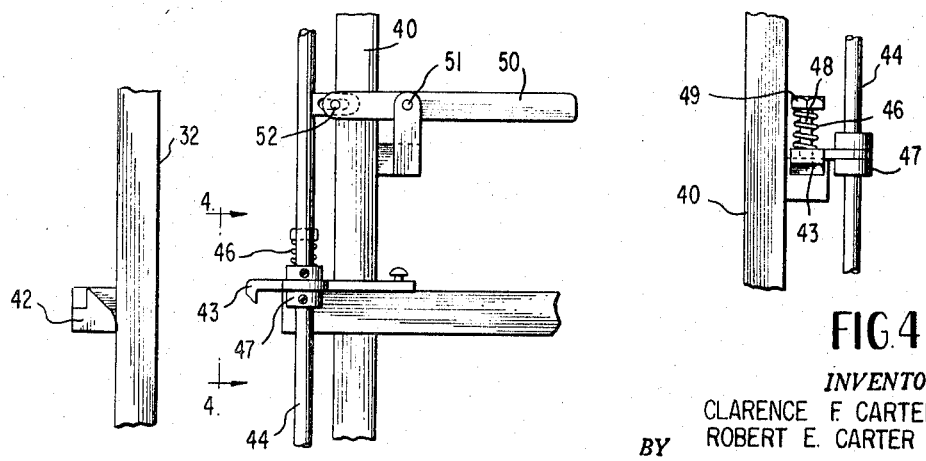
INVENTORS.
CLARENCE F. CARTER
ROBERT E. CARTER
BY Burns, Doane, Benedict, Swecker & Mathis
ATTORNEYS

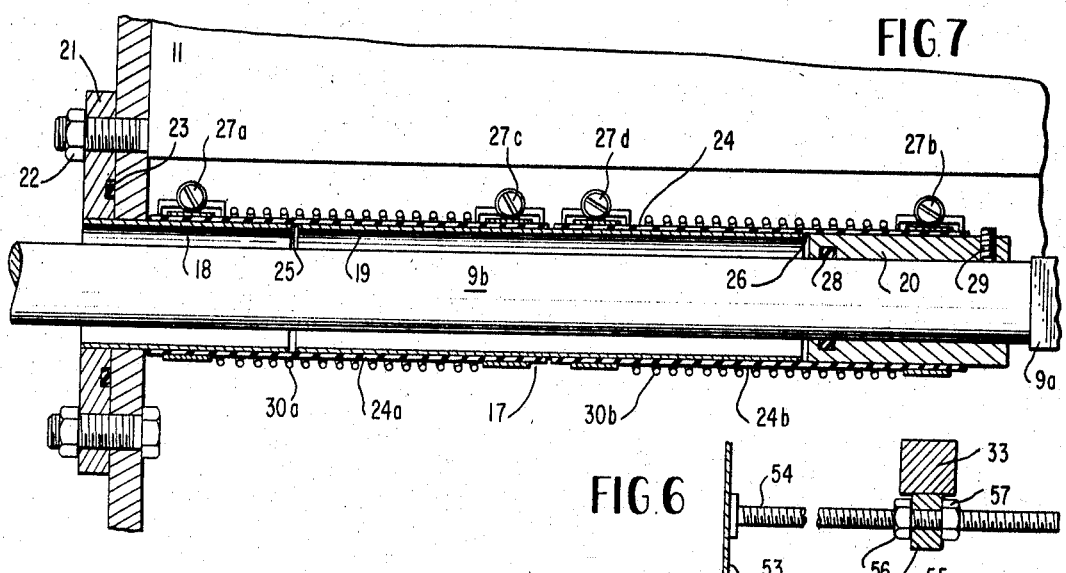
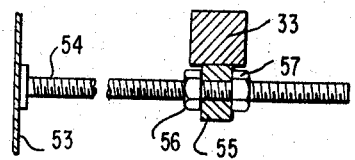
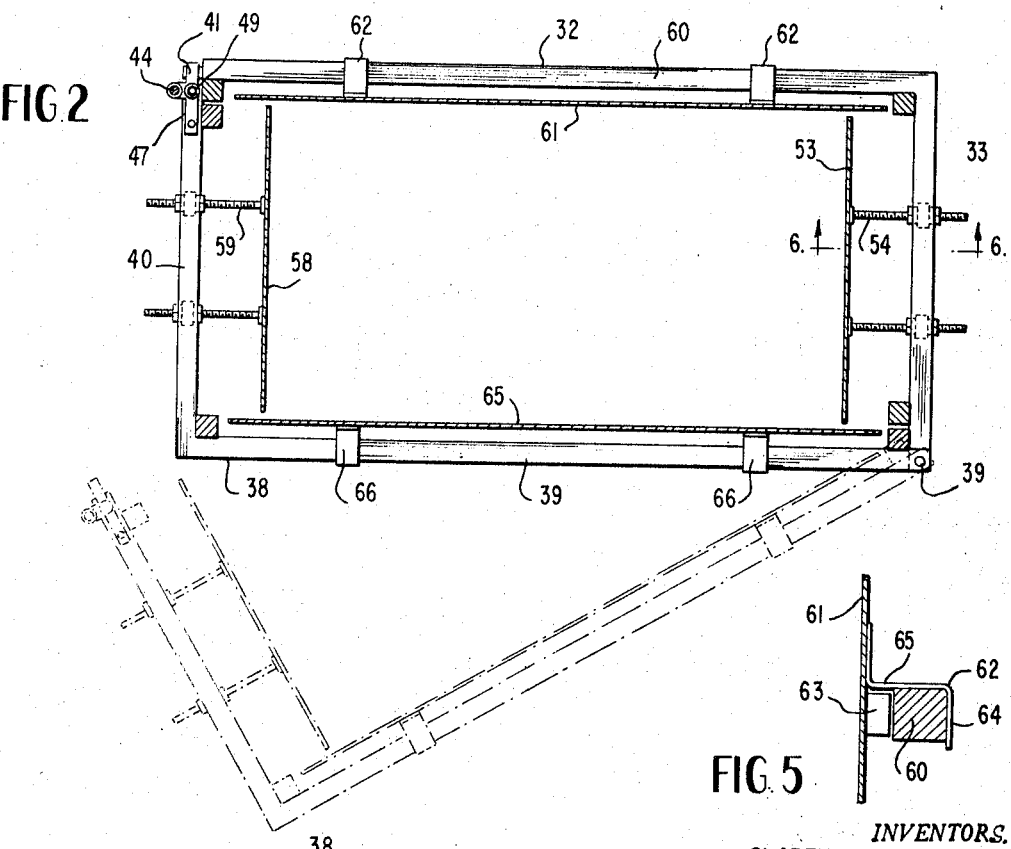

United States Patent Office 3,430,720
Patented Mar. 4, 1969

3,430,720
METHODS AND APPARATUS FOR WEIGHING MATERIAL IN A VACUUM ENVIRONMENT
Clarence F. Carter and Robert E. Carter, Danville, Ill., assignors to Carter Engineering Company, Danville, Ill., a corporation of Illinois
Filed May 12, 1966, Ser. No. 549,709
U.S. Cl. 177—1
Int. Cl. G01g 9/00, 13/00
10 Claims

ABSTRACT OF THE DISCLOSURE

A weighing and filling apparatus including a weigh beam supported within a vacuum housing. Flexible seals sealingly interconnect the weigh beam and the housing and provide fluid reaction surface means acting longitudinally of the weigh beam.

*General background, objects and summary of invention*

It has previously been known that particulate material may be effectively packaged in a vacuum environment concurrent with the weighing of the material. For example, in my prior art 2,765,816 an apparatus is disclosed for conveying particulate material to a package support housed within a vacuum shroud. In this apparatus a linkage extends from the package support through a housing wall to the weigh beam of a weighing device.

Despite the substantial merit attributable to the apparatus featured in my Patent 2,765,816, it has been apparent that it would be desirable to improve upon this apparatus.

In particular, it would be desirable to provide an apparatus of the type shown in my prior patent above-noted which would eliminate the transmittal of vacuum induced force to the weighing apparatus in such a way as to affect the weighing operation.

It would also be desirable to improve upon the apparatus featured in this prior patent so as to more positively protect the weighing device.

Recognizing the need for an improved vacuum weighing and filling apparatus, it is an object of the present invention to provide such an approved apparatus which substantially fulfills the needs previously delineated.

It is likewise an object of the invention to provide an improved apparatus including seal means engaged with a member projecting into a housing such that a vacuum differential across the seal means applies force to the member substantially perpendicular to the direction of force transmitted to the member by other force applying means.

It is likewise an object of the invention to provide such an improved apparatus which effectively houses and shields the relatively delicate mechanism supporting movable elements of a weighing device.

It is also an object of the invention to provide such an improved apparatus wherein a frame for supporting containers or bags is provided with adjustable wall means. These adjustable wall means are movable in a direction perpendicular to the force vector transmitted by the frame to a weighing device such that adjustments in the positions of the walls do not change this transmitted vector.

In order to accomplish at least some of the previously delineated objectives, there is presented through this invention an apparatus including housing means and a force transmitting member projecting from the exterior of the housing means into the interior thereof. A force applying means contained within the housing means is adapted to apply force to the member. Seal means interposed between the housing means and member are adapted to be exposed to a pressure differential between the interior and exterior of the housing means such that a pressure differential exists across the seal means. This seal means is engaged with the force transmitting member such that force exerted on the seal means, as a result of the pressure differential across the seal means, applies force to the member substantially perpendicular to the direction of force transmitted to the member by the force applying means.

Another independently significant facet of the invention resides in a method of transmitting force in a pressure differential environment. In this method a movable member is at least partially housed within housing means. The member is sealingly interconnected with the housing means. A pressure differential is created between the interior and exterior of the housing means such that the pressure differential induced force acting on the movable member applies force to the member in a direction substantially perpendicular to the direction of force transmitted to the member by other force applying means within the housing means.

Another independently significant facet of the invention relates to the utilization of the above-noted method and apparatus concepts in the context of an apparatus for filling containers with particulate material in a vacuum environment and where the aforesaid movable member constitutes a weigh beam of a weighing apparatus.

Still another individually significant facet of the invention relates to the specific structure of the seal means which interconnects the previously noted movable member or weigh beam with a housing means.

This seal means comprises a plurality of coaxial, axially displaced rigid sleeve sections encircling a portion of the movable member with one rigid sleeve being connected in sealed relation with the housing means and another of the rigid sleeve sections being engaged in sealing relation with the movable member. Elastomeric sleeve means extend in coaxial relation with, and connect, the rigid sleeve sections. Coil spring means restrain the elastomeric sleeve means against movement radially away from the rigid sleeve sections. A plurality of clamp means circumscribe the elastomeric sleeve means and are spaced axially therealong. Each clamp means holds a portion of the elastomeric sleeve means against a portion of a rigid sleeve section spaced axially from confronting edges of adjacent rigid sleeve sections. The rigid sleeve section sealingly engaged with the movable member includes wall means extending transversely and symmetrically of the longitudinal axis of the weigh beam such that a pressure differential across the wall means will impose a force on the wall means coaxial with the longitudinal axis of the movable member. The remainder of the rigid sleeve sections are radially spaced from the movable member so as to accommodate movement of the member transversely of its longitudinal axis.

Another noteworthy aspect of the invention relates to a container holding frame including a plurality of container supporting wall means in combination with means for selectively adjusting the positioning of wall means substantially perpendicular to the direction of force applied by the frame to an associated weighing device.

As will be appreciated, the various individual aspects of the invention function in interrelated combination so as to provide optimum benefits of the overall invention.

In describing the invention, reference will be made to a preferred embodiment shown in the application drawings.

*Drawings*

In these drawings:

FIG. 1 is a fragmentary, vertically sectioned view of the improved apparatus of the present invention illustrating the relationship between a weigh beam extending into the housing of the apparatus and seal means which connect opposite ends of the weigh beam to oppositely disposed housing walls;

FIG. 2 is an enlarged, transverse, sectional, and fragmentary view of a container supporting frame of the FIG. 1 apparatus as viewed along section line 2—2 of FIG. 1;

FIG. 3 is an enlarged view of a latch portion of the FIG. 2 frame as viewed along the view direction 3—3 of FIG. 1;

FIG. 4 is an auxiliary view of the FIG. 3 latch as viewed along the view direction 4—4 of FIG. 3;

FIG. 5 is a fragmentary, enlarged sectional view of a portion of the frame of the FIG. 1 apparatus illustrating a hook structure which may be employed to detachably secure wall means to this frame, with the hook structure being viewed along the view direction 5—5 of FIG. 1;

FIG. 6 is an enlarged sectional view of a portion of the FIG. 2 frame as viewed along the section line 6—6 of FIG. 2 and illustrating a threaded rod arrangement for selectively adjusting the positioning of end walls included in this frame; and FIG. 7 is an enlarged vertically sectioned view of the left seal shown in FIG. 1 interconnecting the weigh beam of the FIG. 1 apparatus with the housing means of this apparatus.

Structure of invention

FIG. 1 illustrates an apparatus 1 for filling packages with particulate material in a vacuum environment while the package is being weighed.

The apparatus shown schematically in FIG. 1 comprises a modification of the bag filling machine described in my prior Patent 2,765,816. The filling operation performed by this machine is subject to the general type of control described in specific detail in my prior Patent 2,799,465.

Apparatus 1 includes a housing 2 corresponding in general structure to the housing shown in my Patent 2,765,816. As described in this patent, housing 2 is provided with a door which is opened to receive packages to be filled and which is closed to maintain a vacuum condition within the housing during a vacuum filling operation.

A package or container holding frame 3 is supported within the interior of the housing 2 by a weighing device 4.

Material conveying means comprising a valved, laterally articulated nozzle 5 is rigidly secured to a housing wall 6 as generally shown in FIG. 1 in a manner corresponding to the nozzle mounting shown in my Patent 2,765,816. Nozzle 5, as described in this patent, is laterally flexible and projects from wall 6 into the interior of the frame 3. The end 5a of nozzle 5, as described in Patent 2,765,816, is adapted to be inserted into an upper container or bag end supported within the frame 3 such that material conveyed through the nozzle 5 will enter the interior of such a bag. The end of the nozzle 5a is capable of undergoing vertical movement with the frame 3, as a bag is filled, by virtue of the flexible or articulated character of the nozzle 5 as described in Patent 2,765,816.

Weighing device 4 comprises a fixed support frame 7 mounted in the upper end of housing 2. One or more flexible bands or cables 8 pivotably connect a weigh beam 9 to the fixed frame 7. Weigh beam 9 projects, as shown in FIG. 1, from the left exterior of the housing 2, into the interior 10 of the housing 2 through left housing wall portion 11, and through the right side of housing 2 through oppositely disposed wall portion 12 to the right exterior of the housing 2.

The bag or container holding frame 3 is pivotably, i.e., flexibly, connected to the weigh beam 9 on the right side of the pivot mounting 8 as shown in FIG. 1 by one or more flexible metallic bands or cables 13. The load imposed on weigh beam 9 by frame 3 and a bag filled to a predetermined extent is counterbalanced by appropriately positioned counterbalancing weights 14. As shown in FIG. 1, counterbalance weights 14 may be disposed on the weigh beam 9 on the left exterior of the housing 2.

A switch mechanism 15 may be mounted on a bracket 16 projecting from the housing wall 12. This switch mechanism is adapted to be engaged by the right extremity 9d of the weigh beam when the weigh beam is in a balanced, i.e., horizontal, position. This engagement of the balanced weigh beam with the switch mechanism 15 is designed to effect control over the transmission of material through the nozzle 5 to a bag within the frame 3 as generally described in my prior Patent 2,799,465.

The left and right ends respectively of weigh beam 9 within housing 2 are sealingly but movably connected with housing walls 11 and 12 respectively by substantially identical, but mirror image disposed, seal units 17.

Weigh beam 9 may include a central portion 9a of a rectangular cross-section to facilitate the mounting of the beam in relation to the pivot units 8 and 13. Portions 9b and 9c projecting left and right respectively from central beam portion 9a through the seals 17, as shown in FIG. 1, may be of circular cross-section.

In describing the structural details of seal units 17, reference will be made to FIGS. 1 and 7 which illustrates in enlarged and internal detail, the seal connected with the beam 9 and the housing wall 11.

As shown in FIG. 7, the seal means 17 engaged with wall 11, which is structurally the same as the seal means 17 engaged with the wall 12, includes, a plurality of tubular, axially displaced, relatively rigid, metallic sleeve or conduit sections 18, 19, and 20. Sections 18, 19, and 20 may each be cylindrical in character.

Section 18 is connected by soldering, welding, etc. to a mounting plate 21 which in turn is connected by threaded fasteners 22 to wall 11. An O-ring gasket 23 may be interposed between mounting plate 21 and wall 11 for sealing purposes. Sleeve sections 18, 19, and 20, as shown in FIG. 7, have coaxial peripheries and are all telescopingly and snugly received within an elastomeric sleeve means 24. Sleeve means 24 may be fabricated of rubber, elastomeric plastic, etc. Sleeve means 24 serves to interconnect rigid sleeve sections 18, 19, and 20 with there being an axial gap 25 between sleeves 18 and 19 and an axial gap 26 between sleeves 19 and 20.

Sleeve means 24 may comprise two identical and coaxial elastomeric sleeves 24a and 24b which are disposed in substantially abutting relationship. Sleeve 24a connects sections 18 and 19 and sleeve 24b interconnects sections 19 and 20.

A plurality of conventional hose clamps 27a, 27b, 27c and 27d serves to clamp portions of the sleeve means 24 against portions of the rigid sleeve sections 18, 19, and 20. As illustrated, clamp 27a serves to grip the left extremity of sleeve 24a against the left end of rigid sleeve section 18 within housing 2. Similarly, a clamp 27b grips the right end of elastomeric sleeve 24b against a portion of the right end of rigid sleeve section 20.

The right end of sleeve section 24a and left end sleeve section 24b, as viewed in FIG. 7, are secured by clamps 27c and 27d, respectively, to a mid-portion of the rigid sleeve section 19.

Between the sleeve clamps, the sleeves 24a and 24b are not fixed to the outer peripheries of the rigid sections 18, 19, and 20. Thus, between the sleeve clamps, which are axially spaced from the confronting edges of adjacent rigid sleeve sections, the elastomeric sleeves 24a and 24b are free to undergo longitudinal or axial movement in relation to the rigid sleeve sections, in response to transverse flexing of the seal means 17.

As shown in FIG. 7, rigid sleeve section 20 defines annular wall means extending radially and symmetrically outwardly from the longitudinal axis of weigh beam portion 9b. Sealing engagement between section 20 and weigh beam portion 9b may be effected by an O-ring gasket 28 carried on the inner periphery of section 20. A conventional set screw 29 may serve to clamp sleeve section 20 to the outer periphery of weigh beam portion 9b.

Sleeve sections 18 and 19 are spaced radially outwardly of beam portion 9b so as to accommodate lateral flexure of the weigh beam as it moves in response to the progressive filling of a bag supported by frame 3.

Coil spring means comprising a pair of coil springs 30a and 30b serve to restrain the elastomeric sleeves 24a and 24b, respectively against movement radially outwardly away from the outer periphery of rigid sections 18, 19, and 20. Coil spring 30a is telescoped over the elastomeric sleeve 24a between clamps 27a and 27c while coil spring 30b is telescoped over sleeve 24b between clamps 27b and 27d.

FIGS. 1 through 6 illustrate structural details of the frame 3 and illustrate how the frame 3 may be adjusted so as to provide a selective positioning of bag engaging, frame walls.

Frame 3 includes a main, L-shaped portion 31 including a rear frame section 32 and a right frame side 33, when the apparatus is viewed as shown in FIGS. 1 and 2. Base or main frame portion 31 is connected by a top frame member 34 to the pivot connection 13 extending downwardly from the weigh beam 9.

Under portion 35 of frame 3 is rigidly connected with main frame portion 31 and supports a floor 36. Floor 36 may comprise a panel mounted on supporting rods 37 extending from the frame base 35.

An L-shaped, door-like, frame portion 38 is pivotably connected to main frame portion 31 by conventional pivot means 39. Pivot means 39 enable the door-like frame portion 38 to swing about a vertical pivot axis.

Door portion 38 includes a front frame portion 39 and a left side frame portion 40, viewing the apparatus as shown in FIG. 2.

Frame door 38 may be detachably latched to frame portion 31 by a latch mechanism 41. As shown schematically in FIGS. 3 and 4, latch 41 comprises a cam type, latch plate 42 mounted on rear frame 32 and a spring biased latching lug 43 mounted on left frame side 40. Lug 43 is mounted upon a rod 44 which is supported on frame side 40 for limited vertical movement by a plurality of vertically spaced mounting means 45.

As schematically shown in FIG. 3, a coil spring 46 may be incorporated with an aperatured lug 47 at each mounting 45. Each such lug 47 is rigidly mounted on the rod 44 and includes an apertured end slidably mounted on a rod 48. Each rod 48 is rigidly secured to the frame portion 40 as shown in FIG. 4. Each spring 46 is disposed between its associated lug 47 and an abutment 49 on the upper end of its associated rod 48 so as to bias the rod 44 and its associated latch 43 downwardly into a position of latching engagement with the latching cam 42.

A pivoted handle 50 may be mounted by a conventional pivot mount 51 on frame portion 40. Handle 50 engages rod 44 through a conventional elongate slot and pin pivot connection 52 as generally shown in FIG. 3. With this arrangement, the handle 44 may be employed to cause the rod and latch 43 to be manually moved upwardly so as to move the latch 43 out of latching engagement with the latching cam 42.

Each of frame portions 33 and 40 supports a bag engaging wall mounted for selective adjustment in a horizontal direction. Thus, a wall 53 is connected by a plurality of threaded rods 54 to frame 33. As shown in FIG. 6, each threaded rod 54 passes slidably through an apertured bracket 55 of frame portion 33. A pair of threaded nuts 56 and 57 disposed on opposite sides of bracket 55 serve to selectively adjust and secure the desired position of each rod 54. As will be appreciated the positioning of the rods 54 relative to their associated brackets 55 will determine the positioning of the bag engaging wall 53. Adjustments of the rods 54, which extend horizontally, will cause the wall 53 to be adjusted in a horizontal direction i.e., perpendicular to the direction of force transmitted by the frame 3 through the pivot mounting 13 to the weigh beam 9.

A vertical wall 58 is connected by threaded rods 59 to frame 40 in a manner identical to that in which wall 53 is connected by threaded rods 54 to frame portion 33.

As will be appreciated, rods 37 which support frame floor 36 may comprise floor position adjusting, threaded rods equivalent to the rods 54 associated with the side wall 53.

Frame portion 32 includes a plurality of horizontally extending frame members 60 as generally shown in FIGS. 5 and 2. A rear wall 61 is provided with a plurality of hook-like brackets 62 which serve to detachably mount the wall 61 on the frame portion 32. As schematically shown in FIG. 5, a filler block 63 may be mounted on wall 61 to occupy the space between the side of the wall 61 facing the frame member 60 and the side of the frame member 60 facing the wall 61 so as to hold the downwardly directed leg 64 of the hook 62 firmly against the frame member 60.

Where it is desired to adjust the positioning of the wall 61, either in or out with respect to the center of the frame 3, it is merely necessary to change the size of the hooks 62. By employing hooks with different spacing lengths 65, the distance of the wall 61 from the frame center may be varied. As will be appreciated, those employing the apparatus may stock a series of walls 61, each having differently dimensioned hooks 62 so as to enable the wall hooks to support the wall 61 at the desired spacing from the frame portion 32.

A wall 65 may be mounted by hooks 66 to frame member 67 of frame portion 39 in a manner corresponding to the mounting of wall 61 on frame portion 32. As will be apparent, walls 53, 58, 61 and 65 may comprise solid, bag supporting sheets.

In order to avoid obscuring the improved facets of the present invention in relation to structure shown by prior patents, the appended drawings do not illustrate structural details such as dashpot devices for controlling the movement of the weigh beam and stabilizing linkages for stabilizing vertical movement of the bag supporting frame 3, nor the valves, conduits, etc. for applying and controlling the vacuum within housing 2. However, such structural details are shown in my prior Patents 2,765,816 and 2,799,465.

*Mode of operation of apparatus*

At the outset of a bag or container filling operation, the frame door 38 is opened and a bag positioned within the frame interior so as to be supported upon the floor or base 36. In this connection it will be understood that the position of the base 36 and the walls 53, 58, 61 and 65 will have been previously adjusted so as to support the bag walls in the desired dimensional posture and hold the bag at an elevation so as to enable the nozzle end 5a to enter the upper bag end for the purpose of discharging the material into the interior of the bag.

After the bag has been positioned within the frame interior, with the nozzle 5a entering the upper bag end, the frame door 38 is closed and latched. The door of the housing 2 is then closed. A vacuum is created in the interior 10 of the housing 2 as described in my prior Patent 2,765,816 as material is conveyed into the bag interior.

The vacuum created within the interior 10 of the housing 2 will impose a pressure differential axially across the radial wall means of the rigid sleeve section 20 of each of the seals 17 associated with the weigh beam 9. This pressure differential will cause a force to be exerted on each of the sleeve sections 20, longitudinally or axially of the weigh beam 9. This longitudinal or axial application of force results from the symmetrical and transversely extending character of the radial wall portion of the sleeve section 20 and the overall cylindrical and coaxial character of the seal 17 in relation to the weigh beam 9.

This pressure differential induced application of force to the weigh beam is directed perpendicular to the direction of force applied by the bag containing frame to the weigh beam 9 through the pivot connection 13. Thus, the pressure differential induced force will not impose a vector upon the weigh beam which will be additive or subtractive with respect to the weighing force being transmitted to the weigh beam for weighing purposes.

In this connection it will be understood that the weigh beam 9 is mounted such that its ability to undergo pivotable movement is quite limited. Indeed, it is contemplated that the degree of pivotable movement of the weigh beam may be on the order of 1 or 2 degrees or less. Thus, throughout the range of pivotable movement of the weigh beam, the vacuum induced force applied through the seal means to the weigh beam will be substantially insignificant, if not altogether absent, insofar as this vacuum induced force provides a vertical vector which would interfere with the weighing operation. When the weigh beam 9 is perfectly horizontal i.e., in a balanced position, and in engagement with the switch means 15 such that the linkage 13 applies a purely vertical force to the weigh beam and the seals 17 apply a purely horizontal force to the weigh beam, the vacuum induced force applied to the weigh beam will have no vertical vector which would interfere with the weighing operation.

As the weigh beam undergoes limited pivotable movement, flexing of each seal 17 will occur. This flexing is greatly facilitated by the ability of portions of the elastomeric sleeves 24a and 24b to undergo longitudinal movement in relation to the rigid sleeve sections 18, 19 and 20. This freedom of relative longitudinal movement maximizes the ease with which bending or lateral flexing of the seal 17 occurs. In other words, the elastic properties of substantially the entire length of each of the elastomeric seals contributes to ease of bending.

The coil springs 30a and 30b tend to provide a centering effect or aligning effect with respect to the assembled elastomeric and rigid sleeves. Thus when the beam 9 is horizontal, the seals 17 will impose no weight load on the beam. In addition, these coil springs tend to prevent radially outward ballooning of the elastomeric sleeves. This ballooning might otherwise tend to be produced by the creation of a vacuum within the housing space 2 while atmospheric pressure exists on the exterior of the housing and between the weigh bar and the radially outward spaced portions of the sleeves 24a and 24b at the gaps 25 and 26. The sleeve sections 18, 19 and 20 provide overall structural integrity.

*Advantages and scope of invention*

In describing the structure and mode of operation of the invention, its several advantages have been made apparent.

A prime advantage resides in the manner in which the seal means enable a pressure differential to exist without interfering with or impeding a weighing or force transmitting operation.

Particular advantages are also derivable from the combination of the rigid conduits, elastic sleeves, clamps and coil springs. This arrangement provides a structure affording optimum flexibility, a self-centering action, structural integrity, and a restraining effect tending to prevent ballooning action of the elastomeric sleeve.

The disposition of the weigh beam and its pivot mount within the housing of a container or bag filling apparatus protects the relatively delicate pivot mechanism throughout the filling operation.

The unique and selectively adjustable wall arrangement of the bag supporting frame not only enables the apparatus to be accommodated to the filling of different sized bags, but provides an adjusting concept which does not interfere with or adversely effect force vectors being transferred to a weigh bar.

In describing the invention, reference has been made to preferred method and apparatus embodiments. However, those skilled in the container filling and weighing art and familiar with the disclosure of this invention may well recognize additions, deletions, substitutions or other modifications.

We claim:
1. An apparatus for transmitting force in a pressure differential environment, said apparatus comprising;
  housing means;
  a force transmitting moveable member projecting from the exterior of said housing means into the interior thereof;
  force applying means contained within said housing means and adapted to apply force to said member to induce movement thereof; and
  seal means between said housing means and said member;
  said housing means being operable to contain a vacuum which creates a pressure differential across said seal means; and
  said seal means being engaged with said member and providing fluid reaction means extending transversely of the direction of force transmitted to said member by said force applying means, with said fluid reaction means acting in response to said vacuum to apply force to said member substantially perpendicular to the direction of force transmitted to said member by said force applying means.

2. An apparatus as described in claim 1 wherein said seal means comprises:
  a plurality of coaxial, axially displaced rigid sleeve sections encircling a portion of said moveable member, with one rigid sleeve section being connected in sealed relation with said housing means and another of said rigid sleeve sections being engaged in sealing relation with said moveable member;
  elastomeric sleeve means extending in coaxial relation with and connecting said rigid sleeve sections;
  coil spring means restraining said elastomeric sleeve means against movement radially away from said rigid sleeve sections; and
  a plurality of clamp means circumscribing said elastomeric sleeve means and spaced axially therealong, each clamp means holding a portion of said elastomeric sleeve means against a portion of a rigid sleeve section spaced axially from confronting edges of adjacent rigid sleeve sections;
  said rigid sleeve section sealingly engaged with said moveable member including wall means extending transversely and symmetrically of the longitudinal axis of said moveable member such that said pressure differential will impose a force across said wall means coaxial with the longitudinal axis of said moveable member;
  the remainder of said rigid sleeve sections being radially spaced from said moveable member so as to accommodate movement of said moveable member transversely of its longitudinal axis.

3. An apparatus for weighing material in a sub-ambient pressure environment, said apparatus comprising:
  housing means;
  a weighing device mounted on said housing means and having a weight beam projecting from the exterior of said housing means into the interior thereof;
  container holding means supported within said housing by said weighing device and operable to transmit force to said weigh beam transversely thereof;
  conveying means intersecting said housing and operable to convey particulate material into a container carried by said container holding means;

seal means between said weigh beam and said housing means operable to accommodate transverse movement of said weigh beam relative to said housing means;

said housing means being operable to contain a vacuum, with said vacuum imposing a pressure differential across said seal means; and control means included in said weighing device and operable in response to a balanced position of said weigh beam to control material flow through said conveying means;

said seal means being engaged with said weigh beam and providing fluid reaction means extending transversely of the direction of force transmitted to said weigh beam by said container holding means, with said fluid reaction means acting in response to said vacuum to apply force to said weigh beam longitudinally thereof and substantially perpendicular to the direction of force transmitted from said container holding means to said weigh beam when said weigh beam is substantially balanced.

4. An apparatus as described in claim 3 wherein said seal means comprises:

a plurality of coaxial, axially displaced, rigid sleeve sections encircling a portion of said weigh beam, with one rigid sleeve section being connected in sealed relation with said housing means and another of said rigid sleeve sections being engaged in sealing relation with said weigh beam;

elastomeric sleeve means extending in coaxial relation with and connecting said rigid sleeve sections;

coil spring means restraining said elastomeric sleeve means against movement radially away from said rigid sleeve sections; and a plurality of clamp means circumscribing said elastomeric sleeve means and spaced axially therealong, some of said clamp means holding a portion of said elastomeric sleeve means against a mid-portion of a rigid sleeve section spaced axially from confronting edges of adjacent rigid sleeve sections;

said rigid sleeve section sealingly engaged with said weigh beam including wall means extending transversely and symmetrically of the longitudinal axis of said weigh beam such that said pressure differential created by said vacuum will impose a force across said wall means coaxial with the longitudinal axis of said weigh beam;

the remainder of said rigid sleeve sections being radially spaced from said weigh beam so as to accommodate movement of said weigh beam transversely of its longitudinal axis.

5. An apparatus as described in claim 4 wherein:

confronting edges of adjacent rigid sleeve sections are longitudinally spaced along said weigh beam and wherein said elastomeric sleeve is connected with said rigid sleeve sections solely by said clamp means and said coil spring means, with said elastomeric sleeve means and said rigid sleeve sections being free to undergo relative longitudinal movement between said clamp means in response to radial flexing of said seal means.

6. An apparatus for weighing material in a sub-ambient pressure environment, said apparatus comprising:

housing means;

a weighing device mounted on said housing means and having a weigh beam projecting from the exterior of said housing means into the interior thereof and pivot means supporting said weigh beam disposed entirely within said housing means;

said weigh beam intersecting a pair of spaced walls on opposite sides of said housing means;

container holding means supported within said housing by said weighing device and operable to transmit force to said weigh beam transversely thereof;

conveying means intersecting said housing and operable to convey particulate material into a container carried by said container holding means;

seal means between said weigh beam and said housing means operable to accommodate movement of said weigh beam relative to said housing means;

said housing means being adapted to contain a vacuum, with said vacuum imposing a pressure differential across said seal means; and control means included in said weighing device and operable in response to a balanced position of said weigh beam to control material flow through said conveying means;

said seal means comprises a pair of seals, each seal sealingly interconnecting a portion of said weigh beam with one of said spaced walls;

each said seal of said seal means including:

a plurality of coaxial, axially displaced, rigid sleeve sections encircling a portion of said weigh beam, with one rigid sleeve section being connected in sealed relation with said housing means and another of said rigid sleeve sections being engaged in sealing relation with said weigh beam;

elastomeric sleeve means extending in coaxial relation with and connecting said rigid sleeve sections;

coil spring means restraining said elastomeric sleeve means against movement radially away from said rigid sleeve sections; and a plurality of clamp means circumscribing said elastomeric sleeve means and spaced axially therealong, each clamp means holding a portion of a rigid sleeve section spaced axially from confronting edges of adjacent rigid sleeve sections;

said rigid sleeve section sealingly engaged with said weigh beam including wall means extending transversely and symmetrically of the longitudinal axis of said weigh beam such that said pressure differential created by said vacuum will impose a force across said wall means coaxial with the longitudinal axis of said weigh beam;

the remainder of said rigid sleeve sections being radially spaced from said weigh beam so as to accommodate movement of said weigh beam transversely of its longitudinal axis.

7. An apparatus as described in claim 6 wherein said container holding means comprises:

a frame having a plurality of container supporting wall means; and means for selectively adjusting the positioning of wall means of said frame substantially perpendicular to the direction of force applied by said container holding means to said weigh beam when said weigh beam is balanced.

8. A method for transmitting force in a pressure differential environment, said method comprising:

disposing a force transmitting moveable member projecting from the exterior of housing means into the interior thereof;

applying force to said member within said housing means to induce lateral movement thereof;

creating a pressure differential between the interior and exterior of said housing means;

said pressure differential exerting a force on said member substantially perpendicular to the direction of its lateral movement.

9. A method as described in claim 8 wherein said member comprises:

a weigh beam supporting a mass of material being weighed.

10. A seal apparatus comprising:

housing means;

a movable member projecting into said housing means;

a plurality of coaxial, axially displaced, rigid sleeve sections encircling a portion of said moveable member, with one rigid sleeve section being connected in sealed relation with said housing means and another of said rigid sleeve sections being engaged in sealing relation with said member;

elastomeric sleeve means extending in coaxial relation with and connecting said rigid sleeve sections;

coil spring means restraining said elastomeric sleeve means against movement radially away from said rigid sleeve sections; and a plurality of clamp means circumscribing said elastomeric sleeve means and spaced axially therealong, each clamp means holding a portion of said elastomeric sleeve means against a portion of a rigid sleeve section spaced axially from confronting edges of adjacent rigid sleeve sections;

said rigid sleeve section sealingly engaged with said member including wall means extending transversely of a longitudinal axis of said member;

the remainder of said rigid sleeve sections being radially spaced from said member so as to accommodate transverse movemnet of said member.

References Cited

UNITED STATES PATENTS

| | | | |
|---|---|---|---|
| 2,765,816 | 10/1956 | Carter | 141—65 |
| 2,799,465 | 7/1957 | Carter | 177—1 |
| 3,089,553 | 5/1963 | Gast | 177—1 |
| 3,194,332 | 5/1965 | Wiedemann | 177—241 |

RICHARD B. WILKINSON, *Primary Examiner.*

U.S. Cl. X.R.

177—171, 60